US005091726A

United States Patent [19]

Shyu

[11] Patent Number: 5,091,726

[45] Date of Patent: Feb. 25, 1992

[54] VEHICLE ANTI-COLLISION SYSTEM

[75] Inventor: Jia-Ming Shyu, Taipei, Taiwan

[73] Assignee: Industrial Technology Resarch Institute, Chutung, Taiwan

[21] Appl. No.: 571,137

[22] Filed: Aug. 23, 1990

[51] Int. Cl.[5] .......... G08G 1/16

[52] U.S. Cl. .......... 340/904; 340/903

[58] Field of Search .......... 340/903, 904, 435; 364/461; 180/169

[56] References Cited

U.S. PATENT DOCUMENTS

| | | | |
|---|---|---|---|
| 3,771,123 | 11/1973 | Lanes | 340/435 |
| 4,528,563 | 7/1985 | Takeuchi | 340/903 |
| 4,621,705 | 11/1986 | Etoh | 180/169 |
| 4,622,636 | 11/1986 | Tachibana | 340/904 X |
| 4,833,469 | 5/1989 | David | 340/903 X |
| 4,934,477 | 6/1990 | Dai | 340/435 X |

*Primary Examiner*—Jin F. Ng

*Assistant Examiner*—Brian R. Tumm

*Attorney, Agent, or Firm*—Flehr, Hohbach, Test, Albritton & Herbert

[57] ABSTRACT

An apparatus is provided for preventing a reference car from colliding with a car in front of or behind the reference car by monitoring traffic conditions in front of and behind the reference car and by providing warning and control signals. The apparatus includes distance sensors for measuring the distance between the reference car and a car or any object in front or behind the reference car, a speed sensor for measuring the speed of the reference car, and a micro computer for computing safety distances between cars according to the aforesaid distance and speed measured to operate related actuators for generating warning signals to drivers of the reference car, the front car, and the rear car. The apparatus also provides a method for preventing a reference car from possible collision with other cars or objects.

6 Claims, 7 Drawing Sheets

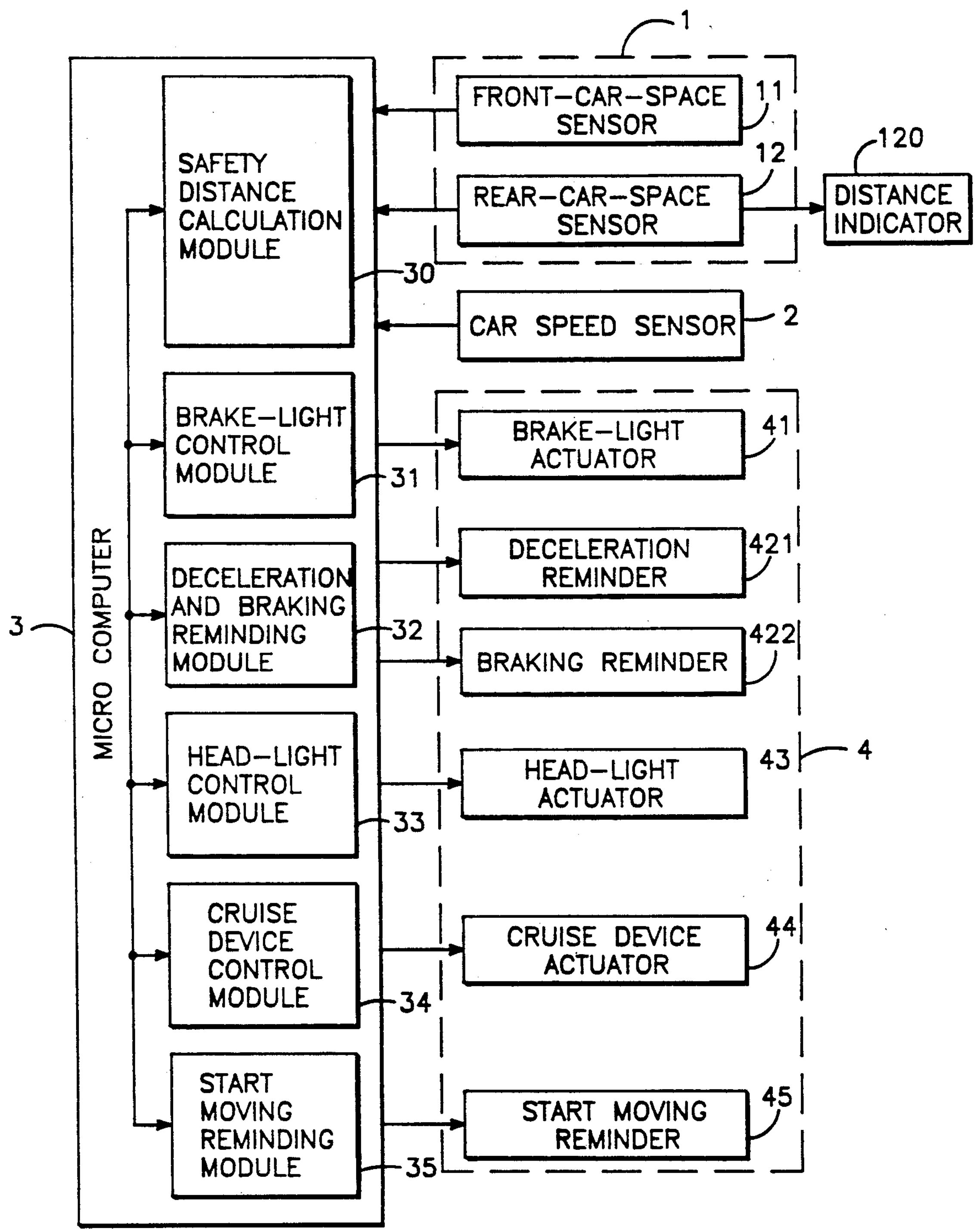
FIG.—1

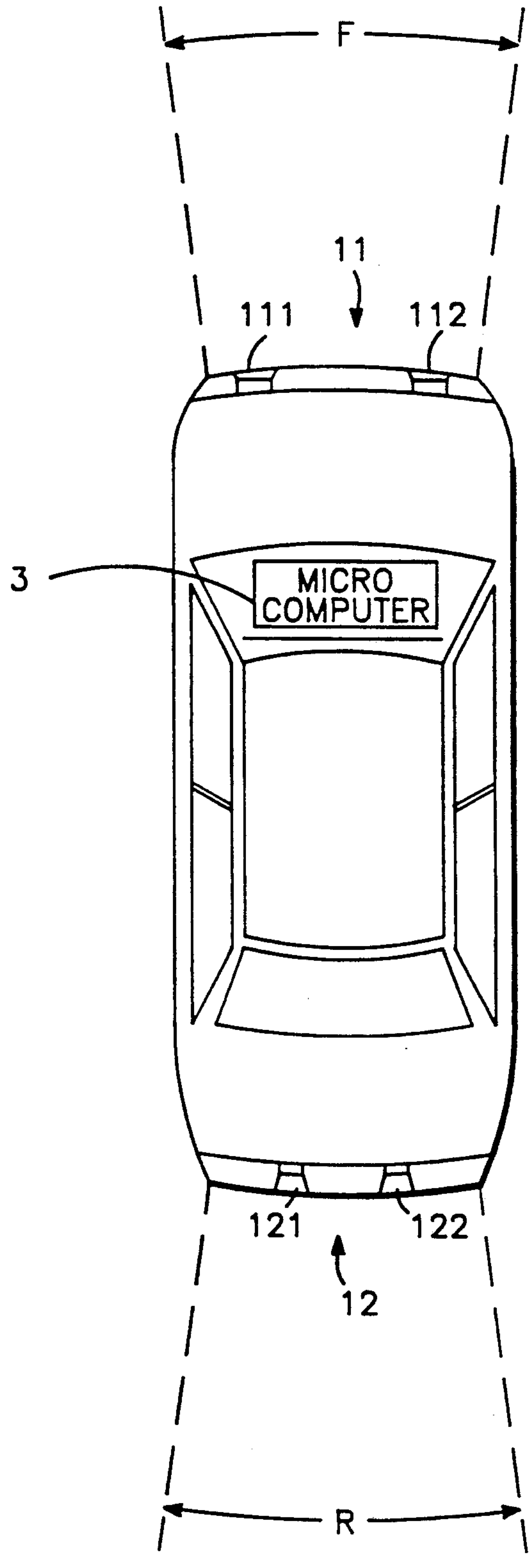
FIG.—2

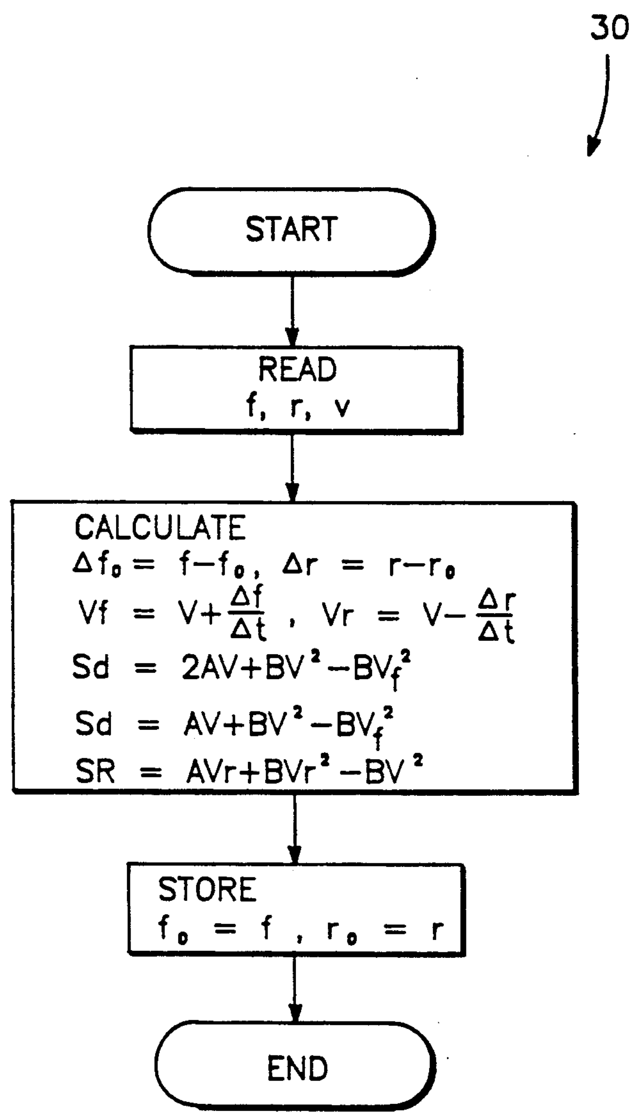
FIG.—3

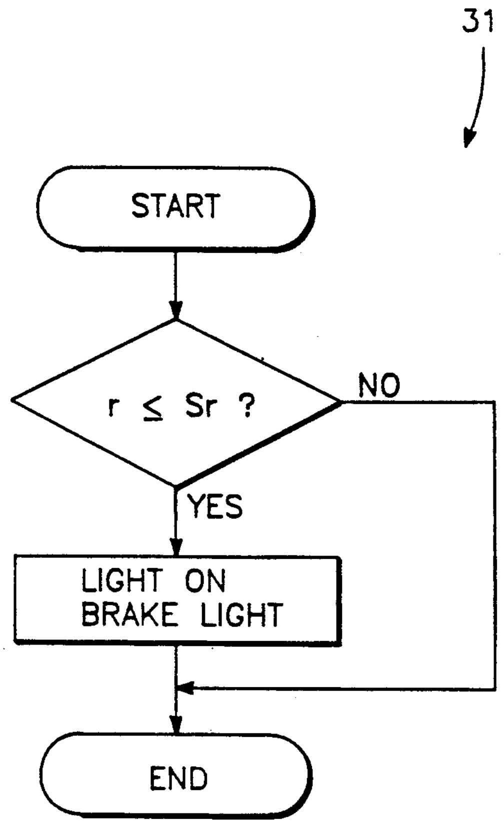
FIG.—4
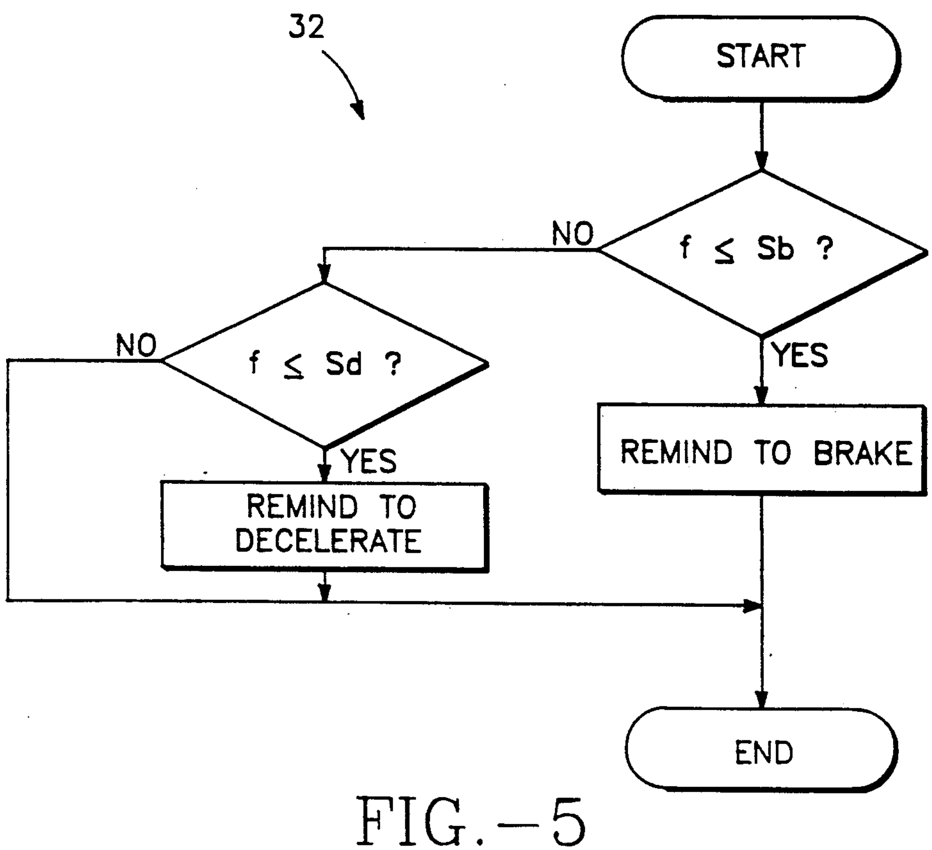
FIG.—5

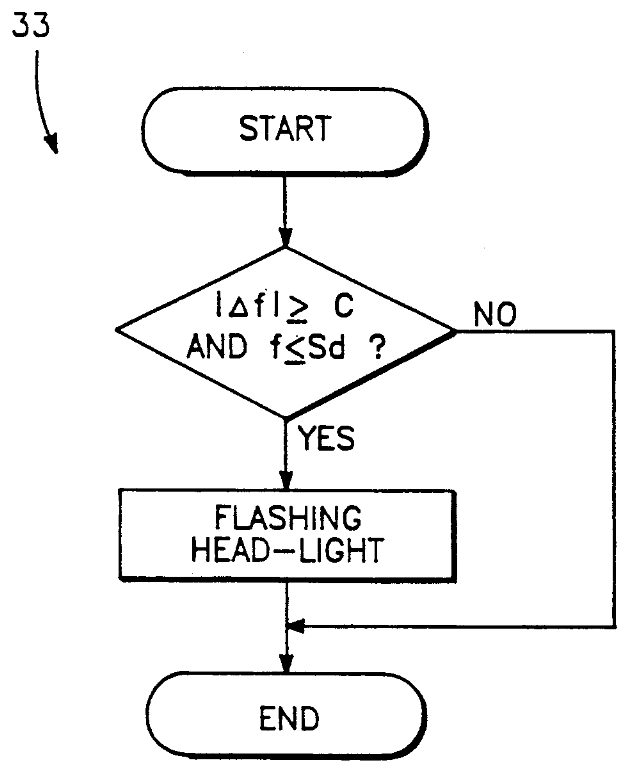
FIG.—6
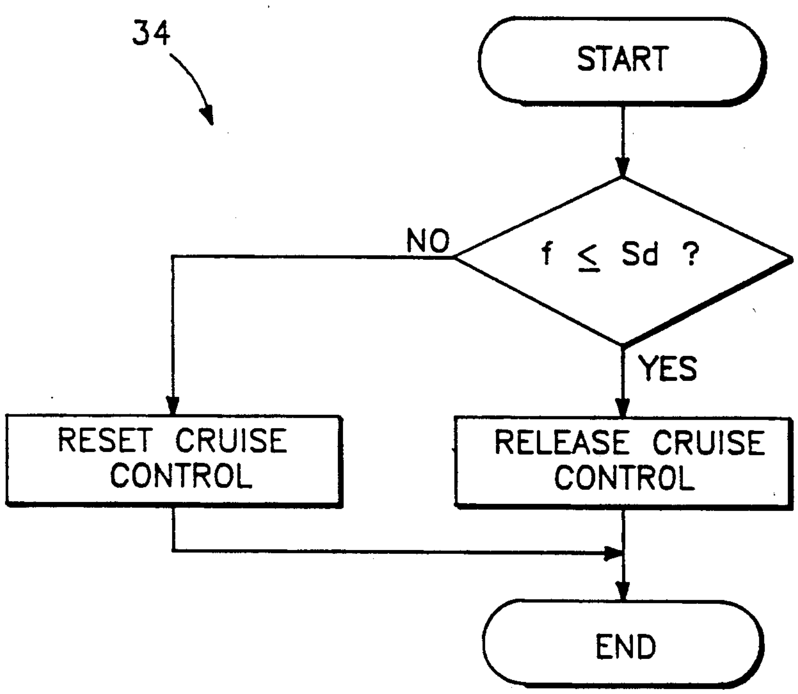
FIG.—7

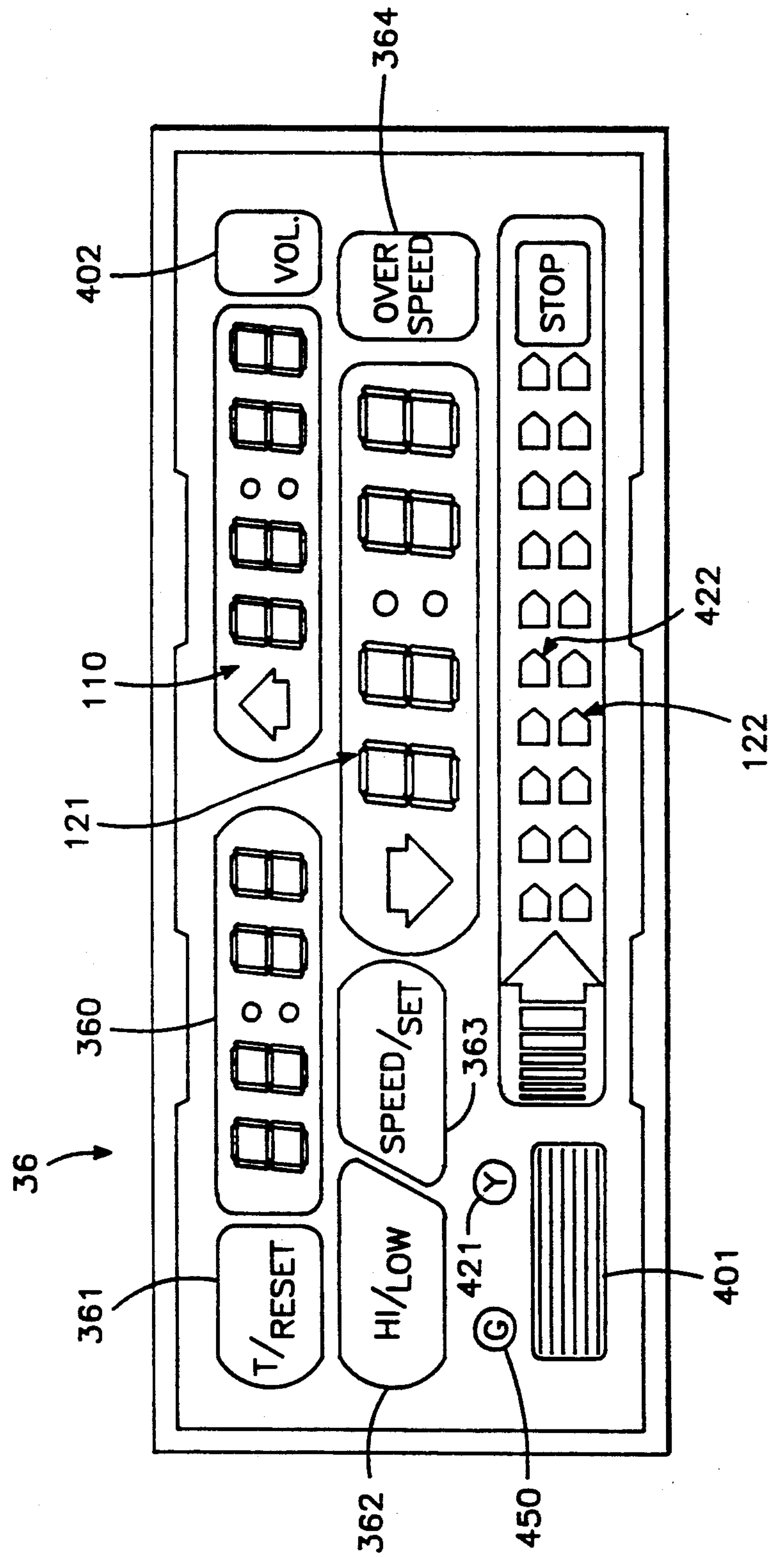
FIG.—9

VEHICLE ANTI-COLLISION SYSTEM

BACKGROUND OF THE INVENTION

It is understood in the art that a certain safety distance while driving must be maintained between cars to avoid collisions. This is because the response of a driver to an emergency is limited by his natural physical condition and acquired driving skill.

Some simple formulas for calculating the safety distance between cars can be obtained. One example of a formula that calculates safety distance is (m)=car speed (km/hr)÷10×car length (m). The safety distance thus derived, however, is impossible to maintain since the driver is unable to estimate it accurately without the help of suitable equipment. Moreover, the safety distance is impossible to maintain since other cars can intrude at random within the safety distance.

Currently, due to the development of anti-skid braking systems (ABS) the braking distance is effectively shortened. However, when a car reduces speed quickly, it is susceptible to collision in the rear by a car which is not equipped with an ABS. Many cars are installed with a third brake light at the rear window to improve the warning to the rear car driver. Nevertheless, collision accidents are likely to occur due to failure to maintain safety distances. Therefore, the development of an apparatus which is able to provide the driver with accurate information on the front and rear safety distance becomes essential.

Some drivers apply the method of slightly stepping on the brake pedal to light up brake lights for warning the rear car, which results in more fuel consumption, more wear on brake linings, increasing driver's mental burden, and causing unexpected collision because of reducing car speed.

SUMMARY OF INVENTION

The present invention relates to a method and apparatus for preventing car collisions by providing certain warnings prior to the occurrence of such a collision.

One object of the present invention is to provide a method and apparatus which can automatically generate a warning signal to a rear car from a car in front of it, allowing the rear car to slow down and decrease the safety distance between the rear car and front car so that the rear car approaches minimum safety distance.

It is especially difficult to maintain a suitable safety distance between cars in a consecutive series of cars on the highway. It is also very likely a collision will occur when any one car reduces its speed suddenly in this situation.

Therefore, another object of the present invention is to provide a pre-warning method and apparatus which can warn the driver of the rear car that the front car is reducing its speed so as to take suitable action to prevent collision with the front car, such as releasing the accelerator or putting on the brake.

When two cars are driving in parallel, adjacent lanes with insufficient safety distance between them, collisions can occur if one car passes into the lane of the neighboring car.

Thus, a third object of the present invention is to provide a method and apparatus which can emit a warning signal to a car that is trying to pass into the adjacent lane in which the other car is driving so as to prevent collision.

Some cars are equipped with an autocruise device which can automatically maintain the car at a preset speed. However, when the distance between a rear car and a front car is insufficient, the driver has to put on the brake or release the cruise button. When the distance between the front car and the rear car appears sufficient in the driver's opinion, the cruise button needs to be reset manually again. If the front car is maintained at a constant speed, the operator of the rear car has to set and release the cruise function repeatedly, and it would be cumbersome to the driver. Further, if the driver of the rear car fails to release the cruise function upon approaching the front car, a collision with the front car will occur.

The fourth object of the present invention is to provide a method and apparatus which can automatically release and reset the function of an automatic cruise device in accordance with the relative speeds of the cars so as to prevent car collision and to let the driver avoid cumbersome repeated operations of the cruise device.

When a car that is traveling in a series of consecutive cars stops due to traffic lights or a traffic jam, the driver often fails to move the car forward immediately after the light or jam is cleared, as a result of being relaxed.

A fifth object of the present invention, therefore, is to provide a method and apparatus, which can remind the driver of this car to start the car immediately when a front car or a rear car starts to move.

In order to fulfill the aforesaid objects, the present invention provides a warning system including distance sensors, a car speed sensor, a micro-computer, and actuating mechanisms. The distance sensors are used for measuring the distance between a rear car (or an object) and front car, and the distance between the front car and another car in front of it (or an object). The car speed sensor is used for measuring the speed of this car. The micro-computer is used for repeatedly computing in time intervals the safety distance between cars in accordance with the aforesaid distances and speed sensed, and the micro-computer will send out control signals to actuate related actuators to generate warning signals or control functions to obtain the following results.

When a rear car is within an unsafe distance of a car in front of it, the brake light of the rear car will light up automatically whether the drive puts on the brake or not. The driver of the rear car would typically release the accelerator, and try to step on the brake pedal or put on the emergency brake. In the present invention, if the rear car has really had the brake on, the driver of the rear car can save time to move his foot from the accelerator to the brake pedal. The response time to put on the brake can thereby be shortened, and the distance to brake the car can be reduced. As to the driver of this car, the pre-brake warning to the rear car is provided automatically by the present system without requiring the driver to take any action, such as by slightly stepping on the brake pedal to light up the brake light. The safety of driving will thus be increased, and collisions with the rear car can be avoided.

The present invention also sends out warning signals when the safety distance between the front car and the rear car become insufficient. When a front car is reducing its speed so that the distance between the front car and rear car become insufficient, the present invention will send out sound signals or light signals to remind the driver of the rear car to take necessary action so as not to collide with the front car. These sound or light signals could be, for example, in the form of a yellow light to warn not to increase speed and a red light to warn to put on a brake.

The present invention also sends out a warning signal when a car in an adjacent, parallel lane passes over into a neighboring lane and cuts in front of another reference car. An object, such as another car or person intruding into the lane of the reference car from an adjacent lane, can suddenly appear in front of the reference car in its lane. If the distance between the reference car and intruding object is less than a safety distance according to the speed of the car, the present invention will automatically flash the head light at a flashing frequency in proportion to the emergency situation so as to warn the front car or person not to intrude. Therefore, the driver of the reference car can concentrate on driving without operating additional warning signals for driving safety.

The present invention also permits the autocruise device to be turned on or off automatically in accordance with the safety distance. Whenever the rear car approaches a front car within a safety distance at a constant cruising speed, the present invention will send out a control electrical signal to release the cruise function so as to slow down the rear car's speed. If the rear car approaches too close to the front car, the present invention will send out a warning signal to remind the rear car driver to put on the brake. As soon as the rear car gets within safety distance of the front car, the present invention will automatically reset the cruise function, so the driver can drive the car in a relaxed manner, need not operate the cruise function repeatedly, can avoid a possible collision, and safely drive.

The present invention can also send out a reminding signal to the driver so that after a temporary stop, due to traffic jam or traffic lights the driver is reminded to start moving the car. For example, when a reference car stops temporarily because of a traffic light or road conditions, the present invention will monitor if there is a car in front of or behind the reference car, and will send out a reminding signal to the driver of that car when the front car starts to move or the rear car approaches the reference car. This signal reminds the driver to drive the reference car forward in a normal manner to prevent collision with the rear car.

BRIEF DESCRIPTION OF THE DRAWINGS

FIG. 1 is a block diagram, showing the overall structure of the apparatus for preventing car collisions constructed in accordance with the present invention.

FIG. 2 illustrates the location of the distance sensors, micro-computer, and some actuators according to the present invention.

FIG. 3 illustrates the mathematical operation steps of the safety-distance calculation module according to the present invention.

FIG. 4 is a block diagram showing the function of the brake-light control module of the present invention.

FIG. 5 is a block diagram showing the function of the deceleration and braking reminding module of the present invention.

FIG. 6 is a block diagram showing the function of the headlight control module of the present invention.

FIG. 7 is a block diagram showing the function of the cruise device control module of the present invention.

FIG. 9 is the front view of an embodiment of the setting-and-display panel according to the present invention.

DETAILED DESCRIPTION OF THE INVENTION

Figure 8:
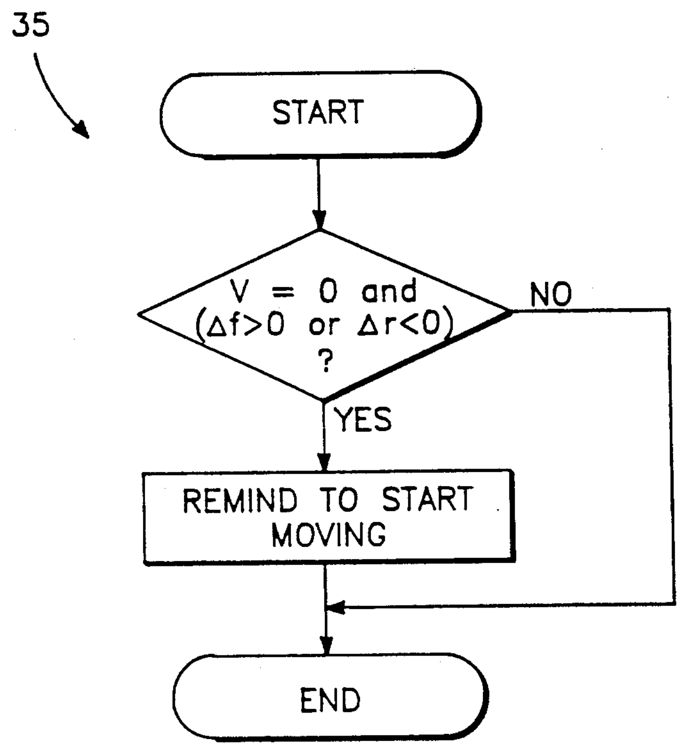
FIG. 8 is a block diagram showing the function of the start moving reminding module of the present invention.

Referring to FIG. the present invention mainly comprises distance sensors 1, car-speed sensor 2, micro-computer (CPV) 3 and actuating mechanisms 4. Distance sensors 1 includes front-car-space sensor 11 and rear-car-space sensor 12, which are installed on the front and rear sides of a car, respectively (as shown in FIG. 2) so as to sense and measure the distance of a car or object in front of and behind the car. Distance sensors 1 may be composed of conventional ultrasonic, laser or radar units, which are well-known in the art and therefore no details thereof are given here.

Either the front car distance or the rear car distance measured will be put in micro-computer 3 repeatedly at time intervals, in which the aforesaid distances and the speed of this car measured by car speed sensor 2 can be calculated to obtain front safety distances and rear safety distances. Speed sensor 2 can pick up the rotating speed or the transmission axle of the car's mechanical or electrical means to convert it into the car speed. Micro-computer 3 includes safety-distance calculation module 30, which can compute a deceleration distance where the speed of the car should be reduced and a braking distance where the car should be braked, according to the space between the driver's car and the car in front of it and the speeds of the cars. The safety distance between a reference car and a car to the rear of it will be computed in accordance with the rear car space and the speeds of the cars.

Actuating mechanisms 4 include brake-light actuator 41, deceleration reminder 421, braking reminder 422, head light actuator 43, cruise device actuator 44, and start moving reminder 45. The aforesaid devices are actuated respectively by the output signals of micro-computer 3 that includes brake-light control module 31, deceleration and braking reminding module 32, head-light control module 33, cruise device control module 34, and start moving reminding module 35. The details for the aforesaid modules will be described in the following paragraphs (when describing FIGS. 3 to 8).

Rear-car-space sensor 12 is connected with distance indicator 120 so as to monitor the distance between a car and obstacles behind it.

FIG. 2 illustrates front-car-space sensor 11 and rear-car-space sensor 12, which include a plurality of sensing elements 111, 112, 121 and 122 so as to sense any obstacle within a given scope at the angles of F and R. Deceleration reminder 421, braking reminder 422, start moving reminder 45, distance indicator 120, and micro-computer 3 may be installed in front of the driver's cab to facilitate watching and operation.

FIG. 3 illustrates the calculation flow chart of safety-distance calculation module 30 of micro-computer 3, in which micro-computer 3 reads first the front car distance f, the rear car distance r and the car speed V. If no object is sensed within a given area, the distance f or r may be considered the maximum value thereof. Micro-computer 3 will compute distance variations $\Delta f$ and $\Delta r$:

$$\Delta f = f - f_0$$

$$\Delta r = r - r_0$$

Where f and r are values measured last time: The front safety distance of the car, which includes the deceleration distance $S_d$ and the braking distance $S_b$ and the rear safety distance $S_r$ of the car are:

$$S_d = 2AV - 2BV\frac{\Delta f}{\Delta t} - B\left(\frac{\Delta f}{\Delta t}\right)^2 \quad (1)$$

$$S_b = AV - 2BV\frac{\Delta f}{\Delta t} - B\left(\frac{\Delta f}{\Delta t}\right)^2 \quad (2)$$

$$S_r = AV - (A + 2BV)\frac{\Delta r}{\Delta t} + B\left(\frac{\Delta r}{\Delta t}\right)^2 \quad (3)$$

in which

A = coefficient on driver's response time;

B = coefficient on brake performance;

$\Delta t$ = the time interval between this calculation and last calculation.

V = car speed

The aforesaid safety distance calculation is based on the total brake distance of a car, including the distance the car moves during the time it takes the driver to apply the brake and the distance the car moves forward from the start of braking until the time the car stops. The brake distance is determined by the coefficient on driver's response multiplied by the car speed V, while the latter distance is determined by the coefficient on brake performance B multiplied by the square root of car speed V. If the coefficient on brake performance of every car is an average value B, and the coefficient on driver's response time is an average value A, the deceleration distance $S_d$ for the car where the driver is reminded to stop increasing car speed so as to maintain a sufficient distance from the front car, should be a value of AV set before the braking distance $S_b$, for reminding the driver to put on brake. The braking distance for the front car at the speed $V_f$ will be $BV_f^2$. Accordingly, the safety distances $S_d$ and $S_b$ needed for a car to avoid any possible collision with the car in front of it will be $$S_d = 2AV + BV^2 = BV_f^2 \quad (4)$$

$$S_b = AV + BV^2 - BV_f^2 \quad (5)$$

Likewise, a rear car at a speed $S_r$ will be warned to slow down or to put on its brake, at a rear safety distance $S_r$ as follows:

$$S_r = AV_r + BV_{r2} - BV^2 \quad (6)$$

In the aforesaid three equations (4), (5), and (6), the front car speed $V_f$ and the rear car speed $V_r$ may be obtained by speed V of the subject car, having relative car speed derivations as follows:

$$V_f = V + \frac{\Delta f}{\Delta t} \quad (7)$$

$$V_f = V - \frac{\Delta r}{\Delta t} \quad (8)$$

After equations (7) and (8) are substituted in equations (4), (5) and (6), equations (1), (2) and (3) can be solved.

Micro-computer 3 will, at a given time interval $\Delta t$, compute and record the aforesaid variable values $\Delta f$, $\Delta r$, and the safety distances $S_d$, $S_b$ and $S_r$ of the car to be used by the modules, described in the following paragraph. The current distances f and r will be stored in memory as last values $f_0$ and $r_0$ to be used for computing the next calculation, and then the calculation procedures of module 30 will end.

FIG. 4 illustrates the function flow chart of deceleration module 31 in micro-computer 3. The rear car distance r is determined by whether the rear car is within the rear safety distance $S_r (r < S_r)$ or not. If so, module 31 will generate an output signal to drive brake-light actuator 41 (as shown in FIG. 1) to light up the brake lights to warn the rear car to slow down. The aforesaid light-up function of the brake lights can be done automatically without the driver having to step on the brakes. Therefore, the driver of this car need not pay any attention to the safety distance of the rear car, but can warn the rear car to maintain a safe distance. Brake light actuator 41 is substantially an electronic switch or a relay, being connected in parallel with the original switch of the brake lights.

FIG. 5 illustrates the function flow chart of deceleration and braking reminding module 32 in micro-computer 3. Module 32 will compare the front car distance f with the front safety distances $S_b$ and $S_d$, and will generate output signals to deceleration reminder 421 and braking reminder 422 (as shown in FIG. 1 and 2) to provide a reminder to the driver to decelerate or brake. When front car distance f is within braking distance $S_b (f < S_b)$, it will warn the driver of this car to put on the brake. When the front car distance f is beyond braking distance $S_b$, but within deceleration distance $S_d (S_b < f < S_d)$, it will warn the driver of this car to slow down the car and maintain a safe distance from the front car. When this car approaches deceleration distance $S_d$, a deceleration reminder (a light or sound signal) will be sent out. The driver may reduce the car speed by releasing the accelerator or putting the brake on slightly. Generally, when the speed difference between the reference car and front car is reduced, the safety distance required between the two cars will also be reduced. As a result, the deceleration reminding signal will disappear, and the reference car can maintain a given distance from the front car. If the speed difference between the reference car and the front car is not reduced (for example, the front car has not applied its brakes), a braking reminding signal (a light or sound signal) will be sent out so as to warn the driver to put on his brake immediately. The deceleration reminder 421 (as shown in FIG. 1) may use a flash lamp, such as an amber light signal, as a warning signal, while the braking reminder 422 may employ a flash lamp, such as a red light, with an intermittent sound signal. The frequency of the intermittent sound signal may vary in accordance with the pressure with which the brake is applied. The frequency Q of the sound signal is proportional to the front car difference between the braking distance $S_b$ and the front car distance f divided by the braking distance $S_b$. The highest frequency Q will be demonstrated by a long, continuous sound so the driver can adequately control the brake. The equation is shown as follows:

$$Q \propto (S_b - f)/S_b$$

FIG. 6 illustrates the function flow chart of headlight control module 33 in micro-computer 3. When the absolute variation value $|\Delta f|$ of the front car distance f is higher than a reference value C, and when the front car distance f is within the deceleration distance $S_d$ of this car ($f<S_d$), a signal will be sent out to head-light actuator 43 (shown in FIG. 1) to flash a couple of times to warn the car that unsafely passes in front of the reference car. The aforesaid reference value C should be set appropriately so as not to cause any actuation under normal (continuous state) variation of car speed between the reference car and the front car. A warning signal may be triggered only when an object (a car or person) suddenly appears in front of the reference car. Head light actuator 43 is substantially an electronic switch or a relay connected in parallel with the switch of the head light. Actuator 43 can light up the low and high beams of the head light simultaneously or interchangeably so that the flash function works regardless of whether the head light is lit up or not.

FIG. 7 illustrates the function flow chart of cruise device control module 34 in micro-computer 3. The module is compatible with any cruise device. Once the cruise device is in operation, module 34 can judge whether the front car distance f is within deceleration distance $S_d$. If so, it will send out a signal to release the cruise function of the cruise device so as to reduce the speed of the car. Otherwise, another signal will be sent out (when the front car distance f is longer than the deceleration distance $S_d$) to reset the cruise function.

FIG. 8 illustrates the function flow chart of the start moving reminding module 35 in micro-computer 3. Module 35 is used to judge whether the reference car is in stop state, and whether the front car or rear car has started moving. When the car is stopped $v=0$, and the system can monitor the condition of both the front and rear cars. Whenever the front car starts to move away ($\Delta f>0$), or the rear car moves to approach the front car ($\Delta r<0$), module 35 will generate a signal to reminder 45 (as shown in FIGS. 1 and 2) to generate an audible reminding signal to remind the driver of the reference car to start moving and thereby prevent collision.

In addition to the function of the aforesaid modules, rear-car-space sensor 12 of the present invention is connected to a distance indicator 120 (as shown in FIG. 1) which can monitor the distance of a rear car or an obstacle behind this car. Indicator 120 not only indicates distance, but also generates an emergency sound in case the distance is gradually reduced. Preferably, when the distance is reduced to 30 cm, the sound signal becomes a continuous sound so as to help the driver reverse the car safely. The aforesaid sound signal may use a common sound generator similar to that of deceleration and braking reminding module 32.

FIG. 9 illustrates a front view of an embodiment of a setting-and-display panel according to the present invention. The panel includes speed-setting and display unit 36 located at the uppermost corner thereof for setting the highest speed of car (or the cruise speed of the cruise device) and displaying the speed value. Indicator 360 displays the driving time and also the speed of the car. Unit 36 also includes a driving-time reset key 361. After the car is started, or the key is pushed downwards, the driving time will be renewed to zero. Unit 36 also includes high-low speed selecting key 362, and speed-setting key 363. The aforesaid two keys are used for selecting and setting two highest speed values to be used in downtown areas and on freeways. For the car without a cruise device, this embodiment provides an over-speed light 364, which will flash as soon as the car exceeds the preset speed. Simultaneously, sound generator 401 will send out a sound signal. The volume of the sound signal can be adjusted by means of volume control key 402. Preferably, above sound generator 401, there is a colored start-moving reminding light 450 and a different colored deceleration reminder light 421, which can generate the start moving flash signal and the deceleration flash signal respectively. At the same time, sound generator 401 will emit a warning sound. The aforesaid warning sounds for overspeed, start moving, and deceleration are made in different modes to aid the driver in distinguishing each mode. The right portion of the panel is, from top to bottom, installed with front-car-distance indicator 110, rear-car-distance indicator 121, braking reminder light assembly 422 and a car-reversing reminder light assembly 122. Distance indicators 110 and 121 can indicate the distance between the reference car and the front and rear cars, respectively. Braking reminder light assembly 422 can include a series of red lamps from left to right. The number of red lamps 422 lit up is proportional to the extent to which the brakes are put on. When heavy braking action is necessary, all the lamps and most of the right side "stop" light will be lit up. Car-reversing reminder light assembly 122 comprises a series of yellow lamps. When a rear car is approaching or when an object appears behind the reference car (up to approximately 3 meters) during the car's reversal, a number of yellow lamps 122 will be lit up in proportion to the approaching distance, and when the approaching distance is reduced to 30 cm., all of the lamps 122 will be lit up. When any of the aforesaid two light assemblies 422, 122 are lit up, sound generator 401 will, at the same time, emit a sound signal in accordance with the urgency of the situation. In the event of an emergency, the sound signal will be a long continuous sound so as to warn the driver.

The aforesaid embodiments merely describe the novelty and spirit of the present invention. The modules of the present invention can be modified. In particular, the configuration of the setting and display panel may be modified or re-arranged.

What is claimed is:

1. An apparatus for preventing a reference car from colliding with a car in front of or behind said reference car by monitoring traffic conditions in front of and behind said reference car and by providing suitable warning and control signals, comprising:

(a) distance sensing means including a front-car-space sensor and a rear-car-space sensor positioned on the front of and the rear of said reference car for measuring distance between one of a front car and object and said reference car and distance between one of a rear car and object and said reference car and providing corresponding electrical signals;

(b) speed sensing means mounted on said reference car for detecting running speed of said reference car and providing corresponding electrical signals;

(c) computer means for operating a plurality of modules therein within suitable time intervals, including a safety-distance calculation module for computing according to said signals of said distance sensing and said speed sensing means, a deceleration distance and a braking distance in front of said reference car and a rear safety distance behind said reference car;

(d) a brake-light control module to monitor said rear car being within the rear safety distance and sending out an electrical signal;

(e) a deceleration and braking reminding module for monitoring and sending out an electrical signal to said reference car in front of said rear car located between said deceleration distance and said braking distance, and monitoring and sending out another electrical signal when said front car is within said braking distance of said reference car;

(f) a head-light control module for monitoring and sending out an electrical signal when one of said front car and object appears within said deceleration distance;

(g) a cruise device control module for monitoring and sending out an electrical signal to said reference car when said front car is within said deceleration distance, and monitoring and sending out another electrical signal when said front car is beyond said deceleration distance; and (h) a start moving reminding module for monitoring and sending out an electrical signal to said reference car when said front car begins to move away or said rear car begins to move towards said reference car while said reference car is stopped; and (i) actuating mechanisms connected with said modules of said computer means including, a brake-light actuator for lighting up brake lights of said reference car in accordance with the electrical signal from said brake-light control module;

a deceleration reminder and a braking reminder for generating respective light and sound signals in accordance with said electrical signals from said deceleration and braking reminding module;

a head-light actuator for illuminating head lights of said reference car in a flashing manner in accordance with said electrical signal from said head-light control module;

a cruise device actuator for releasing and resetting the cruise function of said reference car in accordance with said cruise device control module; and a start moving reminder for generating light and sound signals in accordance with said electrical signal from said start moving reminding module.

2. The apparatus of claim 1, wherein said safety-distance calculation module computes said deceleration distance $S_b$, and rear safety distance $S_r$ by the following equations:

$$S_d = 2AV - 2BV\frac{\Delta f}{\Delta t} - B\left(\frac{\Delta f}{\Delta t}\right)^2$$

$$S_b = AV - 2BV\frac{\Delta f}{\Delta t} - B\left(\frac{\Delta f}{\Delta t}\right)^2$$

$$S_r = AV - (A + 2BV)\frac{\Delta r}{\Delta t} + B\left(\frac{\Delta r}{\Delta t}\right)^2$$

wherein,

A = coefficient on driver's response time;

B = coefficient on brake performance;

V = speed of said driven car;

Δf = variation of the front-car-distance measured this time with that of last time;

Δr = variation of the rear-car-distance measured this time with that of last time;

Δt = the time interval.

3. The apparatus of claim 1, wherein said sound signal of said braking reminder varies its frequency in accordance with the amount of braking required relative to whether said front car is within said braking distance.

4. A method for preventing a reference car from colliding with a car in front of or behind said reference car by monitoring traffic conditions in front of and behind said reference car and by providing suitable warning and control signals, comprising:

(a) distance sensing for measuring distance between one of a front car and object and said reference car and distance between one of a rear car and object and said reference car and providing corresponding electrical signals;

(b) speed sensing for detecting running speed of said reference car and providing corresponding electrical signals;

(c) operating computer means for a plurality of modules therein within suitable time intervals, including calculating safety-distance for computing according to said signals of said distance sensing of step (a) and said speed sensing of step (b), a deceleration distance and a braking distance in front of said reference car and a rear safety distance behind said reference car;

(d) monitoring said rear car being within said rear safety distance and sending out an electrical signal with a brake-light control module;

(e) monitoring and sending out an electrical signal to said reference car in front of said rear car located between said deceleration distance and said braking distance by using a deceleration and braking reminding module, and monitoring and sending out another electrical signal when said front car is within said braking distance of said reference car;

(f) monitoring and sending out an electrical signal by using a head-light control module when one of said front car and object appears within said deceleration distance;

(g) monitoring and sending out an electrical signal to said reference car when said front car is within said deceleration distance by using a cruise device control module, and monitoring and sending out another electrical signal when said front car is beyond said deceleration distance; and (h) monitoring and sending out an electrical signal to said reference when said front car begins to move away of said rear car begins to move towards said reference car while said reference car is stopped by use of a start moving reminding module; and (i) actuating mechanisms connected with said modules of said computer means by using, a brake-light actuator for lighting up brake lights of said reference car in accordance with the electrical signal from said brake-light control module;

a deceleration reminder and a braking reminder for generating respective light and sound signals in accordance with said electrical signals from said deceleration and braking reminding module;

a head-light actuator for illuminating head lights of said reference car in a flashing manner in accordance with said electrical signal from said head-light control module;

a cruise device actuator for releasing and resetting the cruise function of said reference car in accordance with said cruise device control module; and a start moving reminder for generating light and sound signals in accordance with said electrical signal from said start moving reminding module.

5. The method of claim 4 wherein said safety-distance calculation module computes said deceleration distance $S_b$, and rear safety distance $S_r$ by the following equations:

$$S_d = 2AV - 2BV\frac{\Delta f}{\Delta t} - B\left(\frac{\Delta f}{\Delta t}\right)^2$$

$$S_b = AV - 2BV\frac{\Delta f}{\Delta t} - B\left(\frac{\Delta f}{\Delta t}\right)^2$$

-continued $$S_r = AV - (A + 2BV)\frac{\Delta r}{\Delta t} + B\left(\frac{\Delta r}{\Delta t}\right)^2.$$

wherein,

A = coefficient on driver's response time;

B = coefficient on brake performance;

V = speed of said driven car;

$\Delta f$ = variation of the front-car-distance measured this time with that of last time;

$\Delta r$ = variation of the rear-car-distance measured this time with that of last time;

$\Delta t$ = the time interval.

6. The method of claim 4 wherein said sound signal of said braking reminder varies its frequency in accordance with the amount of braking required relative to whether said front car is within said braking distance.

* * * * *